United States Patent
Tamao et al.

(10) Patent No.: US 12,340,091 B2
(45) Date of Patent: Jun. 24, 2025

(54) INFORMATION PROCESSING SYSTEM FOR VEHICLE DATA STORAGE, FAILURE DETECTION, AND DRIVE DISTANCE CONSISTENCY MANAGEMENT

(71) Applicant: TOYOTA JIDOSHA KABUSHIKI KAISHA, Toyota (JP)

(72) Inventors: Junichiro Tamao, Tokyo (JP); Takahiro Utsunomiya, Tokyo (JP); Tomoaki Karasawa, Matsudo (JP); Takumi Horie, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/503,574

(22) Filed: Nov. 7, 2023

(65) Prior Publication Data

US 2024/0184453 A1     Jun. 6, 2024

(30) Foreign Application Priority Data

Dec. 2, 2022 (JP) ................................ 2022-193410

(51) Int. Cl.
*G06F 3/06* (2006.01)

(52) U.S. Cl.
CPC .......... *G06F 3/0616* (2013.01); *G06F 3/0649* (2013.01); *G06F 3/0683* (2013.01)

(58) Field of Classification Search
CPC ..... G06F 3/0616; G06F 3/0649; G06F 3/0683
See application file for complete search history.

(56) References Cited

U.S. PATENT DOCUMENTS

| | | | | |
|---|---|---|---|---|
| 6,192,484 | B1* | 2/2001 | Asano | G06F 11/2289 |
| | | | | 714/36 |
| 11,861,181 | B1* | 1/2024 | Moser | G06F 11/141 |
| 2003/0043158 | A1* | 3/2003 | Wasserman | G09G 5/346 |
| | | | | 345/545 |
| 2003/0055599 | A1* | 3/2003 | Ohle | G01C 22/02 |
| | | | | 702/158 |
| 2004/0088122 | A1* | 5/2004 | Nanaji | G07F 15/10 |
| | | | | 702/45 |
| 2005/0237221 | A1* | 10/2005 | Brian | H04Q 9/00 |
| | | | | 340/870.02 |
| 2008/0034156 | A1* | 2/2008 | Kawaguchi | G06F 11/004 |
| | | | | 711/114 |
| 2012/0290651 | A1* | 11/2012 | Westbrooke | H04Q 9/00 |
| | | | | 709/204 |
| 2021/0215766 | A1* | 7/2021 | Ji | G01R 31/389 |

FOREIGN PATENT DOCUMENTS

JP     2016-170604 A     9/2016

* cited by examiner

*Primary Examiner* — Eric T Loonan
(74) *Attorney, Agent, or Firm* — Oblon, McClelland, Maier & Neustadt, L.L.P.

(57) ABSTRACT

An information processing system includes processing circuitry, a first storage, and a second storage. The processing circuitry stores the same specific data in the first storage and the second storage. The processing circuitry compares the specific data stored in the first storage with the specific data stored in the second storage. The processing circuitry determines that one of the first storage and the second storage has reached end-of-life on condition that the specific data stored in the first storage and the specific data stored in the second storage do not agree with each other.

5 Claims, 3 Drawing Sheets

INFORMATION PROCESSING SYSTEM FOR VEHICLE DATA STORAGE, FAILURE DETECTION, AND DRIVE DISTANCE CONSISTENCY MANAGEMENT

BACKGROUND

1. Field

The present disclosure relates to an information processing system, a storage medium, and a data write count management method.

2. Description of Related Art

Japanese Laid-Open Patent Publication No. 2016-170604 discloses an information processing system that includes an execution unit and a storage. The execution unit calculates the write count to the storage. The execution unit determines whether the calculated write count exceeds a predetermined upper limit value. When the calculated write count exceeds the upper limit value, the execution unit determines that the storage has reached end-of-life.

In the information processing system disclosed in the aforementioned publication, the upper limit value is determined by taking into consideration factors such as the safety factor. The upper limit value is thus set to a value less than the write count at which the storage actually reaches end-of-life. Therefore, it is not possible to accurately determine that the storage has actually reached end-of-life and has become unwritable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an information processing system includes processing circuitry, a first storage, and a second storage. The processing circuitry is configured to store same specific data in the first storage and the second storage, compare the specific data stored in the first storage with the specific data stored in the second storage, and determine that one of the first storage and the second storage has reached end-of-life on condition that the specific data stored in the first storage and the specific data stored in the second storage do not agree with each other.

In another general aspect, a storage medium is provided that stores a program configured to be executed by the above-described information processing system.

In a further general aspect, a data write count management method is provided that is executed by the above-described information processing system.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Structure of Vehicle

An embodiment of the present disclosure will now be described with reference to FIGS. 1 to 3. First, a schematic configuration of a vehicle 100 will be described.

Figure 1:
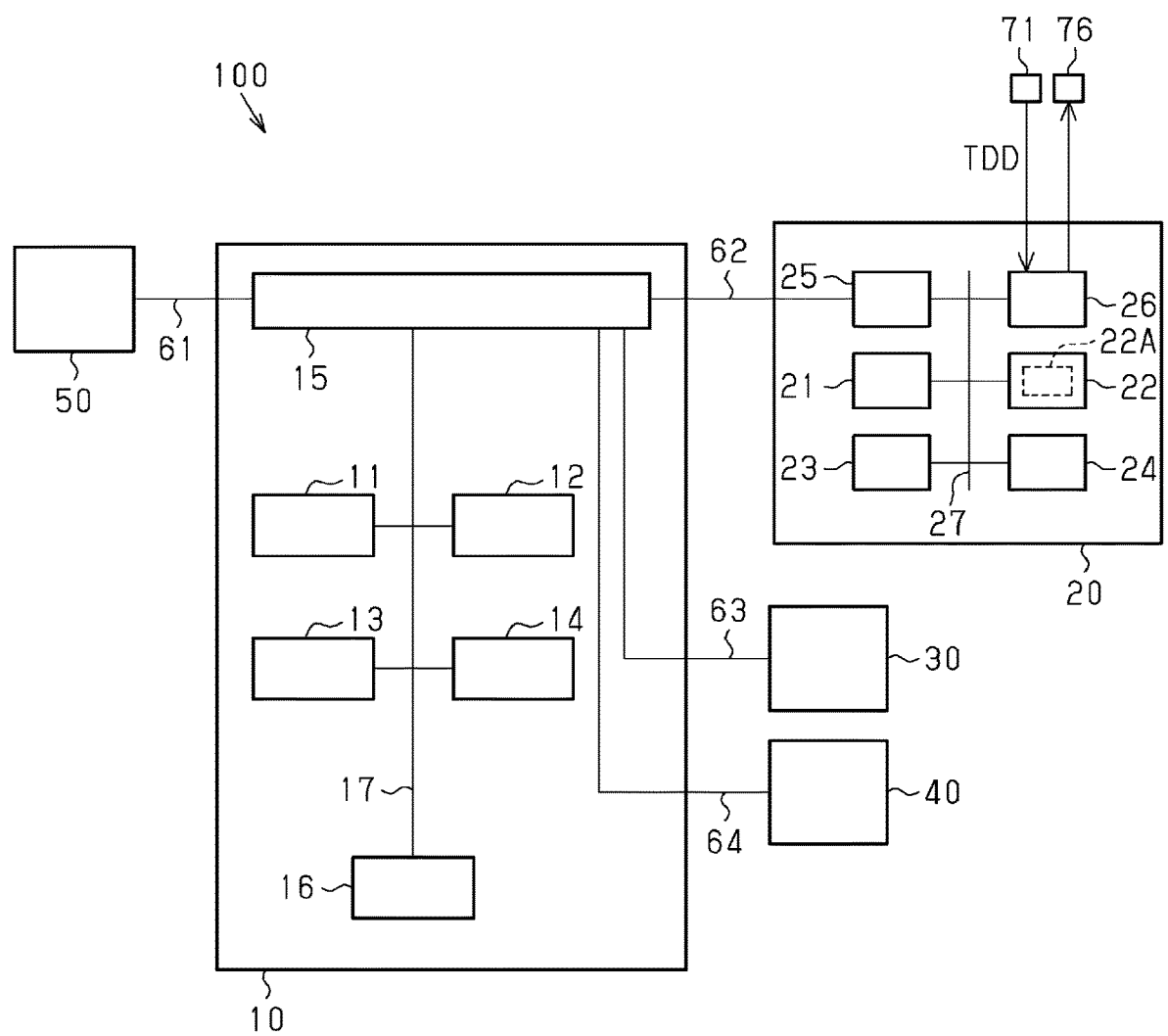
FIG. 1 is a schematic diagram showing a configuration of a vehicle.

As shown in FIG. 1, the vehicle 100 includes a central electronic control unit (ECU) 10, a meter ECU 20, a multimedia ECU 30, an advanced driver assist ECU 40, and a display control module (DCM) 50. The vehicle 100 also includes a first external bus 61, a second external bus 62, a third external bus 63, and a fourth external bus 64.

The central ECU 10 controls the entire vehicle 100 in a centralized manner. The central ECU 10 includes a central processing unit (CPU) 11, a read-only memory (ROM) 12, a random-access memory (RAM) 13, and a storage 14. The central ECU 10 also includes a communication interface 15, an input/output interface 16, and an internal bus 17. The internal bus 17 connects the CPU 11, the ROM 12, the RAM 13, the storage 14, the communication interface 15, and the input/output interface 16 so that they can communicate with each other. The ROM 12 stores various types of programs and various types of data in advance. The RAM 13 is a volatile memory. The RAM 13 temporarily stores various types of programs and various types of data. The CPU 11 uses the RAM 13 as a workspace and executes various types of processes by reading programs in the ROM 12.

The storage 14 is capable of storing various types of programs and various types of data. The storage 14 is a nonvolatile memory, which can be electrically rewritten. The storage 14 is a NAND flash memory. One example of the storage 14 is an embedded multimedia card (eMMC). The storage 14 has an upper limit write count. The write count to the storage 14 corresponds to the number of times data is written to the same memory cell. Therefore, "write" here includes not only writing information to empty memory cells, but also overwriting the stored content of memory cells to which information has already been written. The upper limit write count of the storage 14 is the number of times write operations can be performed in one memory cell or a specified memory frame. Therefore, the total capacity of the storage 14, including data overwriting, is the product of multiplying the capacity of a memory cell or memory frame, the number of memory cells or memory frames, and the number of writable times. In the present embodiment, the storage 14 is a first storage.

The communication interface 15 is an interface to be connected to the meter ECU 20, the multimedia ECU 30, the advanced driver assist ECU 40, and the DCM 50. The communication interface 15 also functions as an interface to be connected to an engine ECU, a transmission ECU, a vehicle body ECU, and the like (not shown). The input/output interface 16 is an interface to be connected to a group of sensors and a group of devices in the vehicle 100.

The DCM 50 is connected to the communication interface 15 of the central ECU 10 via the first external bus 61. The DCM 50 is capable of wirelessly communicating with devices outside the vehicle 100 via a wireless communication network (not shown).

Accordingly, the central ECU 10 can wirelessly communicate with devices outside the vehicle 100 via the first external bus 61 and the DCM 50.

The meter ECU 20 executes processes related to various types of meters including an odometer 71, which will be discussed below. The meter ECU 20 includes a CPU 21, a ROM 22, a RAM 23, and a storage 24. The meter ECU 20 includes a communication interface 25, an input/output interface 26, and an internal bus 27. The internal bus 27 connects the CPU 21, the ROM 22, the RAM 23, the storage 24, the communication interface 25, and the input/output interface 26 so that they can communicate with each other. The ROM 22 stores various types of programs and various types of data in advance.

The ROM 22 stores, in advance, an information processing program 22A as one of the various types of programs. The RAM 23 is a volatile memory. The RAM 23 temporarily stores various types of programs and various types of data. The CPU 21 uses the RAM 23 as a workspace and executes various types of processes by reading programs in the ROM 22. Further, the CPU 21 reads out the information processing program 22A to execute various types of processes in the data write count management method. In the present embodiment, the CPU 21 is an execution unit or processing circuitry.

The storage 24 is capable of storing various types of programs and various types of data. The storage 24 is a nonvolatile memory, which can be electrically rewritten. The storage 24 is a NOR flash memory. The above-described storage 14 is a NAND flash memory. Therefore, the predetermined upper limit write count of the storage 24, which is a NOR flash memory, is at least one order of magnitude greater than the predetermined upper limit write count for the storage 14. In the present embodiment, the storage 24 is a second storage. Therefore, the information processing system includes the storage 14 of the central ECU 10, the CPU 21 of the meter ECU 20, and the storage 24 of the meter ECU 20.

The communication interface 25 is an interface to be connected to the central ECU 10. The communication interface 25 is connected to the communication interface 15 of the central ECU 10 via the second external bus 62. Thus, the meter ECU 20 can communicate with the central ECU 10. The input/output interface 26 is an interface to be connected to a group of sensors and a group of devices in the vehicle 100.

The multimedia ECU 30 controls a navigation device, an audio device, and the like (not shown). The multimedia ECU 30 is connected to the communication interface 15 of the central ECU 10 via the third external bus 63. Since the internal configuration of the multimedia ECU 30 is substantially the same as that of the meter ECU 20, the description thereof will be omitted. The advanced driver assist ECU 40 implements functions of advanced driver assist by executing various types of applications. The various types of applications include an application for following a preceding vehicle while maintaining a constant distance from the preceding vehicle and an application for automatically applying brakes to reduce damage caused by a collision of the vehicle 100. The advanced driver assist ECU 40 is connected to the communication interface 15 of the central ECU 10 via the fourth external bus 64. Since the internal configuration of the advanced driver assist ECU 40 is substantially the same as that of the meter ECU 20, the description thereof will be omitted.

The vehicle 100 includes a group of sensors. The group of sensors includes the odometer 71. The odometer 71 detects a total driving distance TDD of the vehicle 100. The total driving distance TDD is the total distance traveled by the vehicle 100 from the time point at which the vehicle 100 was manufactured to the current time point. The odometer 71 is connected to the input/output interface 26 of the meter ECU 20. Further, the vehicle 100 includes a group of devices. The group of devices includes a display 76. The display 76 displays various types of information. The display 76 is located near the driver's seat of the vehicle 100. The display 76 is connected to the input/output interface 26 of the meter ECU 20.

Storage Control

Next, a storage control executed by the CPU 21 of the meter ECU 20 will be described with reference to FIG. 2. The CPU 21 of the meter ECU 20 repeatedly executes the storage control at predetermined control intervals. In the present embodiment, the CPU 21 of the meter ECU 20 executes the storage control by reading the information processing program 22A.

Figure 2:
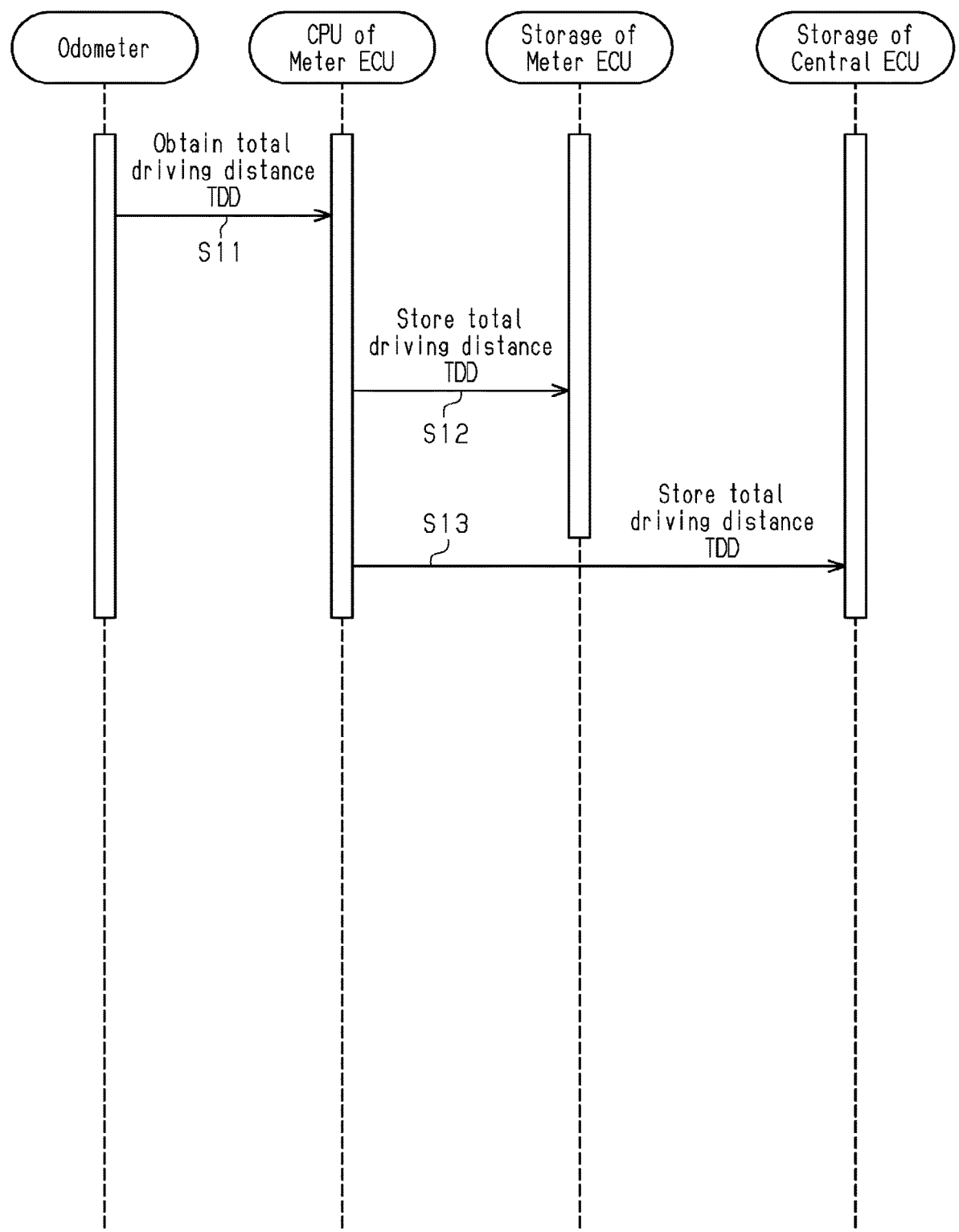
FIG. 2 is a sequence chart showing a storage control.

As shown in FIG. 2, when starting the storage control, the CPU 21 of the meter ECU 20 executes the process of step S11. In step S11, the CPU 21 of the meter ECU 20 obtains the total driving distance TDD from the odometer 71. After step S11, the CPU 21 of the meter ECU 20 advances the process to step S12.

In step S12, the CPU 21 of the meter ECU 20 stores the total driving distance TDD, which has been obtained in step S11, in the storage 24 of the meter ECU 20. If the total driving distance TDD is already stored in the storage 24, the CPU 21 overwrites it with the latest total driving distance TDD. The total driving distance TDD is an example of specific data. After step S12, the CPU 21 of the meter ECU 20 advances the process to step S13.

In step S13, the CPU 21 of the meter ECU 20 stores the total driving distance TDD, which has been obtained in step S11, in the storage 14 of the central ECU 10. That is, the CPU 21 of the meter ECU 20 stores the same specific data in the storage 14 of the central ECU 10 and the storage 24 of the meter ECU 20. If the total driving distance TDD is already stored in the storage 14, the CPU 21 overwrites it with the latest total driving distance TDD. After step S13, the CPU 21 of the meter ECU 20 terminates the current storage control. Then, the CPU 21 of the meter ECU 20 advances the process to step S11 again.

Determination Control

Next, a determination control executed by the CPU 21 of the meter ECU 20 will be described with reference to FIG. 3. When a predetermined specific condition is met, the CPU 21 repeatedly executes the determination control at predetermined control intervals. One example of the specific condition is that an anomaly flag is OFF. The anomaly flag is OFF at the time when the vehicle 100 is manufactured. The anomaly flag is set to ON in the process of step S41, which will be discussed below. In the present embodiment, the CPU 21 executes the determination control by reading the information processing program 22A.

Figure 3:
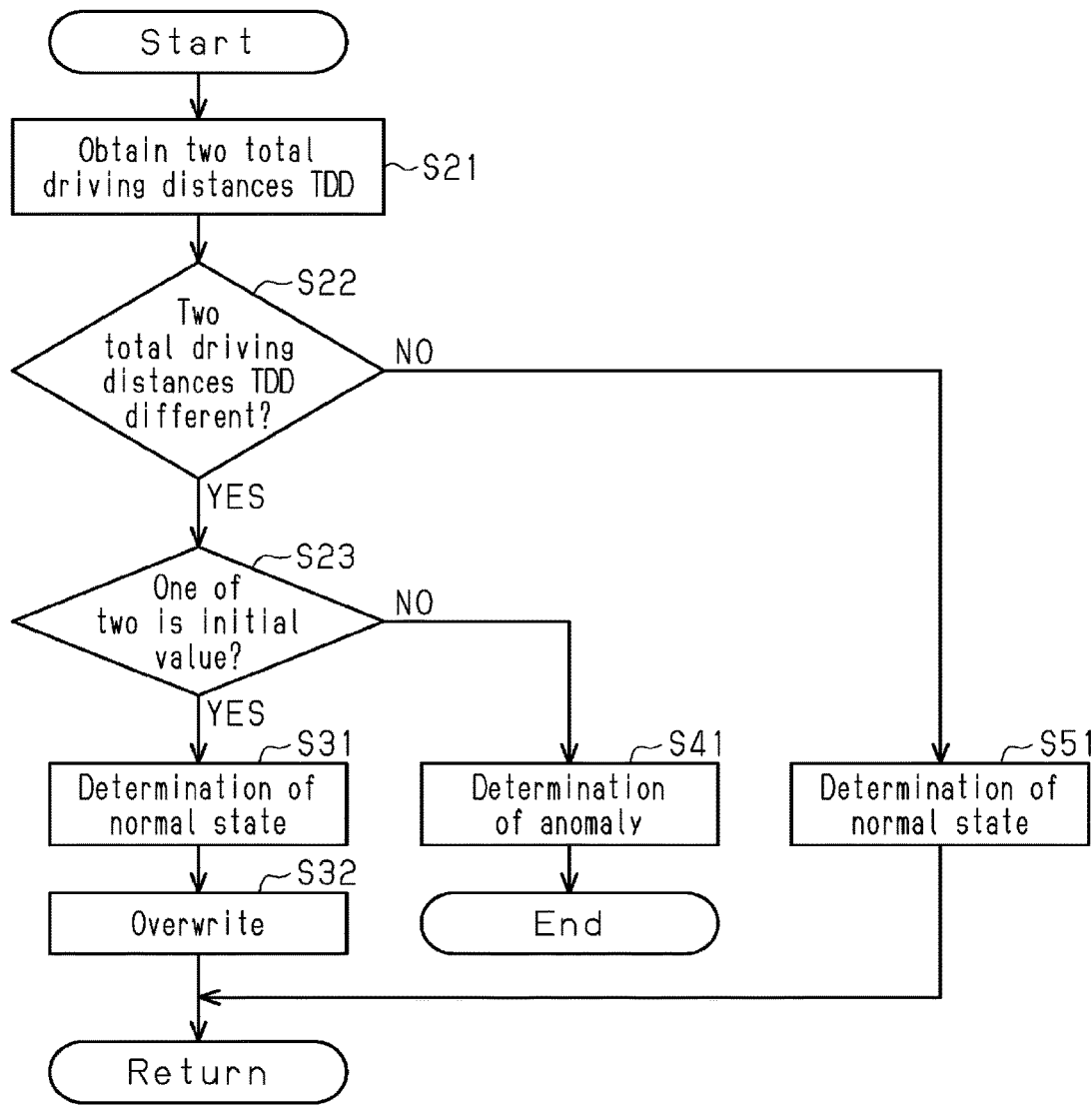
FIG. 3 is a flowchart showing a determination control.
Throughout the drawings and the detailed description, the same reference numerals refer to the same elements. The drawings may not be to scale, and the relative size, proportions, and depiction of elements in the drawings may be exaggerated for clarity, illustration, and convenience.

As shown in FIG. 3, when starting the determination control, the CPU 21 executes the process of step S21. In step S21, the CPU 21 accesses the storage 14 of the central ECU 10 to obtain the total driving distance TDD stored in the storage 14. Further, the CPU 21 obtains the total driving distance TDD stored in the storage 24 of the meter ECU 20 by accessing the storage 24. In other words, the CPU 21 obtains two total driving distances TDD respectively stored in the storage 14, which serves as the first storage, and the storage 24, which serves as the second storage. After step S21, the CPU 21 advances the process to step S22.

In step S22, the CPU 21 determines whether the two total driving distances TDD obtained in step S21 are different. In step S22, when determining that the two total driving distances TDD are different (S22: YES), the CPU 21 advances the process to step S23. In other words, the CPU 21 advances the process to step S23 on condition that the compared two total driving distances TDD do not agree with each other.

In step S23, the CPU 21 determines whether one of the two the total driving distances TDD obtained in step S21 is a predetermined initial value. In the present embodiment, the initial value is 0. In step S23, when determining that one of the two total driving distances TDD obtained in step S21 is the initial value (S23: YES), the CPU 21 advances the process to step S31.

In step S31, the CPU 21 determines that the storage 14 of the central ECU 10 and the storage 24 of the meter ECU 20 are normal. In other words, even if the two total driving distances TDD do not agree with each other, the CPU 21 does not determine that neither the storage 14 nor the storage 24 has reached end-of-life when one of the two total driving distances TDD is the initial value. After step S31, the CPU 21 advances the process to step S32.

In step S32, the CPU 21 overwrites the total driving distance TDD determined to be the initial value in the process of step S23, between the total driving distances TDD stored in the storage 14 of the central ECU 10 and the storage 24 of the meter ECU 20. For example, the CPU 21 may determine that the total driving distance TDD in the storage 24 of the meter ECU 20 is the initial value in step S23. In this case, the CPU 21 overwrites the total driving distance TDD stored in the storage 24 of the meter ECU 20 with the same value as the total driving distance TDD stored in the storage 14 of the central ECU 10. After step S32, the CPU 21 terminates the current determination control. Then, the CPU 21 advances the process to step S21 again.

On the other hand, in the above described step S23, when determining that neither of the two total driving distances TDD obtained in step S21 is the initial value (S23: NO), the CPU 21 advances the process to step S41. In other words, when the two total driving distances TDD do not agree with each other and neither of the two total driving distances TDD is the initial value, the CPU 21 advances the process to step S41.

In step S41, between the storage 14 of the central ECU 10 and the storage 24 of the meter ECU 20, the CPU 21 determines that the storage 14 of the central ECU 10 has an anomaly. In other words, the CPU 21 determines that the storage 14 of the central ECU 10 has reached end-of-life. Further, the CPU 21 stores the fact that the storage 14 of the central ECU 10 has reached end-of-life in the storage 24 of the meter ECU 20. Further, by outputting a control signal to the display 76, the CPU 21 notifies the user of the vehicle 100 or the like of the fact that the storage 14 of the central ECU 10 has reached end-of-life via the display 76. Then, the CPU 21 sets the anomaly flag to ON. After step S41, the CPU 21 terminates the current determination control.

On the other hand, in step S22, when determining that the two total driving distances TDD agree with each other (S22: NO), the CPU 21 advances the process to step S51.

In step S51, the CPU 21 determines that the storage 14 of the central ECU 10 and the storage 24 of the meter ECU 20 are normal. After step S51, the CPU 21 terminates the current determination control. Then, the CPU 21 advances the process to step S21 again.

Operation of Present Embodiment

A case will be discussed in which, for example, the storage 14 of the central ECU 10 has reached end-of-life in the vehicle 100. In this case, even if the storage control is executed, the total driving distance TDD cannot be correctly stored in the storage 14 of the central ECU 10. Accordingly, the total driving distance TDD stored in the storage 14 of the central ECU 10 and the total driving distance TDD stored in the storage 24 of the meter ECU 20 no longer agree with each other.

Advantages of Present Embodiment (1) As described above, when the total driving distance TDD stored in the storage 14 and the total driving distance TDD stored in the storage 24 no longer agree with each other, it is determined that the two total driving distances TDD are different from each other in step S22 of the determination control. Then, on condition that the two total driving distances TDD do not agree with each other, it is determined in step S41 that the storage 14 of the central ECU 10 has reached end-of-life. Thus, in the present embodiment, it is possible to accurately determine that the storage 14 of the central ECU 10 has actually reached end-of-life.

(2) In the vehicle 100, the predetermined upper limit write count of the storage 14 of the central ECU 10 is less than the predetermined upper limit write count for the storage 24 of the meter ECU 20. Thus, in a situation in which the total driving distance TDD stored in the storage 14 of the central ECU 10 and the total driving distance TDD stored in the storage 24 of the meter ECU 20 no longer agree with each other, the storage 14 of the central ECU 10 is highly likely to have reached end-of-life.

In this regard, the CPU 21 of the meter ECU 20 determines, in step S41, that the storage 14 of the central ECU 10 has reached end-of-life. This allows for the determination of which storage, either the storage 14 of the central ECU 10 or the storage 24 of the meter ECU 20, has reached end-of-life. In addition, it is possible to prevent the storage 24 having a low possibility of reaching end-of-life from being erroneously determined to have reached end-of-life, between the storage 14 of the central ECU 10 and the storage 24 of the meter ECU 20.

(3) For example, a case will be discussed in which the storage 24 of the meter ECU 20 is replaced with a new storage 24 in the vehicle 100. In this case, even if the storage 14 of the central ECU 10 and the storage 24 of the meter ECU 20 are normal, the two total driving distances TDD do not agree with each other. For example, when the total driving distance TDD in the storage 24 of the meter ECU 20 is the initial value, it is considered that the storage 24 has been replaced. Therefore, the CPU 21 of the meter ECU 20 determines that the storage 14 and the storage 24 have reached end-of-life when the two total driving distances TDD do not agree with each other and neither of the two total driving distances TDD is the initial value. In other words, even when the two total driving distances TDD do not agree with each other, the CPU 21 of the meter ECU 20 does not determine that the storage 14 and the storage 24 have reached end-of-life if one of the two total driving distances TDD is the initial value. As a result, it is possible to prevent the storage 14 and the storage 24 from being erroneously determined to have reached end-of-life due to replacement of the storage 14 or the storage 24.

(4) A case will be discussed in which the total driving distance TDD is not stored in the storage 14 of the central ECU 10 and is stored only in the storage 24 of the meter ECU 20. In this case, when the storage 24 of the meter ECU 20 is replaced with a new storage 24 as described above, the total driving distance TDD may be lost. If the data of the total driving distance TDD is lost in this way, there arises a problem that, for example, the used price of the vehicle 100 cannot be correctly calculated.

In this regard, in the storage control, the CPU 21 of the meter ECU 20 stores the total driving distance TDD, which is specific data, in the storage 14 of the central ECU 10 and the storage 24 of the meter ECU 20. Then, in the determination control, the CPU 21 of the meter ECU 20 overwrites, in step S32, the value of the total driving distance TDD determined to be the initial value in the process of step S23, between the total driving distances TDD stored in the storage 14 of the central ECU 10 and the storage 24 of the meter ECU 20. As a concrete example, the CPU 21 of the meter ECU 20 overwrites the total driving distance TDD, which is the initial value stored in the storage 24 of the meter ECU 20, with the same value as the total driving distance TDD stored in the storage 14 of the central ECU 10. As a result, even if the storage 24 is replaced, for example, it is possible to store the total driving distance TDD, which should originally be stored, in the replaced storage 24.

(5) In step S41, the CPU 21 of the meter ECU 20 determines that the storage 14 of the central ECU 10 has reached end-of-life. Then, the CPU 21 of the meter ECU 20 outputs a control signal to the display 76 to notify the user of the vehicle 100 or the like of the fact that the storage 14 of the central ECU 10 has reached end-of-life via the display 76. This prompts the user of the vehicle 100, or the like, to perform maintenance on the vehicle 100.

(6) In step S41, the CPU 21 of the meter ECU 20 determines that the storage 14 of the central ECU 10 has reached end-of-life. The CPU 21 of the meter ECU 20 then stores the fact that the storage 14 of the central ECU 10 has reached end-of-life in the storage 24 of the meter ECU 20. This allows a worker or the like performing maintenance on vehicle 100 to understand that the storage 14 of the central ECU 10 has reached end-of-life by accessing the storage 24 of the meter ECU 20, which has not reached end-of-life.

Modifications

The above-described embodiment may be modified as follows. The above-described embodiment and the following modifications can be combined as long as the combined modifications remain technically consistent with each other.

In the above-described embodiment, the storage control may be changed.

For example, in the storage control, the CPU 21 of the meter ECU 20 may store the same specific data, encrypted in different formats, in both the storage 14 of the central ECU 10 and the storage 24 of the meter ECU 20. Even in this case, in a situation in which the specific data is correctly stored in the storage 14 of the central ECU 10 and the storage 24 of the meter ECU 20, the CPU 21 of the meter ECU 20 can obtain the same specific data by decryption in the determination control.

In the above-described embodiment, the determination control may be changed.

For example, the process of step S32 may be omitted. Specifically, if the storage 14 of the central ECU 10 and the storage 24 of the meter ECU 20 are normal, the total driving distance TDD in the storage 14 of the central ECU 10 and the total driving distance TDD in the storage 24 of the meter ECU 20 may agree with each other by executing the storage control. When the total driving distances TDD agree with each other in this manner, the impact is minimal even if the process of step S32 is omitted.

For example, the process of step S23 may be omitted. Specifically, since the opportunity to replace storage 14 or storage 24 is rare, the impact is minimal even if the process of step S23 is omitted. In this configuration, when the CPU 21 of the meter ECU 20 makes an affirmative determination in step S22, the process may proceed to step S41.

For example, a storage that has reached end-of-life does not necessarily need to be identified in step S41. Specifically, the CPU 21 of the meter ECU 20 may determine that one of the storage 14 of the central ECU 10 or the storage 24 of the meter ECU 20 has reached end-of-life. At this time, the CPU 21 of the meter ECU 20 may store, in the storage 24 of the meter ECU 20, the fact that one of the storage 14 of the central ECU 10 or the storage 24 of the meter ECU 20 has reached end-of-life. Similarly, the CPU 21 of the meter ECU 20 may notify, via the display 76, the user of the vehicle 100 or the like of the fact that one of the storage 14 of the central ECU 10 or the storage 24 of the meter ECU 20 has reached end-of-life.

For example, the process of storing the determination result may be omitted in step S41. Specifically, the CPU 21 of the meter ECU 20 does not necessarily need to store the fact that the storage 14 of the central ECU 10 has reached end-of-life in the storage 24 of the meter ECU 20. Even in this case, if a worker or the like performs maintenance on vehicle 100, they might be able to ascertain that the storage 14 of the central ECU 10 has reached end-of-life.

For example, the notification process may be omitted in step S41. Specifically, the CPU 21 of the meter ECU 20 does not necessarily need to notify the user of the vehicle 100 or the like of the fact that the storage 14 of the central ECU 10 has reached end-of-life via the display 76. Even in this case, a worker or the like may ascertain that the storage 14 of the central ECU 10 has reached end-of-life when performing maintenance on vehicle 100.

In the above-described embodiment, the configuration of the vehicle 100 may be changed.

For example, the specifications of the storage 14 of the central ECU 10 and the storage 24 of the meter ECU 20 may be changed. Specifically, the storage 14 of the central ECU 10 may be a NOR flash memory. Also, the storage 24 of the meter ECU 20 may be a NAND flash memory.

For example, the predetermined upper limit write count of the storage 14 of the central ECU 10 may be greater than the predetermined upper limit write count for the storage 24 of the meter ECU 20. In this case, in step S41, the CPU 21 of the meter ECU 20 determines that the storage 24 of the meter ECU 20 has reached end-of-life.

For example, the execution unit or the processing circuitry is not limited to the CPU 21 of the meter ECU 20. Specifically, the execution unit or the processing circuitry may be the CPU 11 of the central ECU 10. Also, the execution unit or the processing circuitry may be a CPU of the multimedia ECU 30. That is, the execution unit or the processing circuitry may be provided in an ECU other than the ECU including the first storage and the second storage.

For example, the first storage is not limited to the storage 14 of the central ECU 10. Specifically, the first storage may be the storage 24 of the meter ECU 20. In this case, a storage other than the storage 24 of the meter ECU 20 may be employed as the second storage. Also, the first storage may be a storage of the multimedia ECU 30.

For example, the second storage is not limited to the storage 24 of the meter ECU 20. Specifically, the second storage may be the storage 14 of the central ECU 10. In this case, a storage other than the storage 14 of the central ECU 10 may be employed as the first storage. Also, the second storage may be the storage of the multimedia ECU 30.

In the above-described embodiment, the specific data is not limited to the total driving distance TDD, and may be changed to other data.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing system, comprising:
   processing circuitry;
   a first storage; and
   a second storage, wherein
   the processing circuitry is configured to
      store a same total driving distance of a vehicle in the first storage and the second storage,
      compare the total driving distance stored in the first storage with the total driving distance stored in the second storage,
      determine that one of the first storage and the second storage has reached end-of-life when the total driving distance stored in the first storage and the total driving distance stored in the second storage do not agree with each other and the total driving distance stored in the first storage and the total driving distance stored in the second storage are not a predetermined initial value of 0, and
      overwrite the total driving distance stored in the second storage with the total driving distance stored in the first storage without determining that the first storage and the second storage have reached end-of-life when the total driving distance stored in the first storage and the total driving distance stored in the second storage do not agree with each other and the total driving distance stored in the second storage is the predetermined initial value.

2. The information processing system according to claim 1, wherein
   a predetermined upper limit write count of the first storage is less than a predetermined upper limit write count of the second storage, and
   the processing circuitry is configured to determine that the first storage has reached end-of-life in a case in which the total driving distance stored in the first storage and the total driving distance stored in the second storage do not agree with each other.

3. The information processing system according to claim 1, wherein the processing circuitry is configured to store a fact that the first storage has reached end-of-life in the second storage when the first storage has reached end-of-life.

4. The information processing system according to claim 1, wherein the processing circuitry is configured to notify that one of the first storage and the second storage has reached end-of-life when determining that one of the first storage and the second storage has reached end-of-life.

5. A non-transitory storage medium storing a program configured to be executed by an information processing system including processing circuitry, a first storage, and a second storage, wherein the program is configured to cause the processing circuitry to
   store a same total driving distance of a vehicle in the first storage and the second storage,
   compare the total driving distance stored in the first storage with the total driving distance stored in the second storage, and
   determine that one of the first storage and the second storage has reached end-of-life when the total driving distance stored in the first storage and the total driving distance stored in the second storage do not agree with each other and the total driving distance stored in the first storage and the total driving distance stored in the second storage are not a predetermined initial value of 0, and
   overwrite the total driving distance stored in the second storage with the total driving distance stored in the first storage without determining that the first storage and the second storage have reached end-of-life when the total driving distance stored in the first storage and the total driving distance stored in the second storage do not agree with each other and the total driving distance stored in the second storage is the predetermined initial value.

* * * * *